United States Patent
Lewis

(10) Patent No.: US 9,338,838 B2
(45) Date of Patent: May 10, 2016

(54) HALF- OR QUARTER-CYCLE CURRENT REGULATOR FOR NON-ISOLATED, LINE VOLTAGE L.E.D. BALLAST CIRCUITS

(71) Applicant: 4382412 Canada Inc., Williston, VT (US)

(72) Inventor: Jason P. Lewis, Waterbury, VT (US)

(73) Assignee: 4382412 Canada Inc., Williston, VT (US)

( * ) Notice: Subject to any disclaimer, the term of this patent is extended or adjusted under 35 U.S.C. 154(b) by 416 days.

(21) Appl. No.: 13/830,499

(22) Filed: Mar. 14, 2013

(65) Prior Publication Data
US 2014/0265859 A1    Sep. 18, 2014

(51) Int. Cl.
*H05B 37/02*    (2006.01)
*H05B 33/08*    (2006.01)

(52) U.S. Cl.
CPC ........ *H05B 33/0812* (2013.01); *H05B 33/0854* (2013.01); *Y02B 20/345* (2013.01)

(58) Field of Classification Search
CPC ..................... H05B 33/0854; H05B 33/0812
USPC ................ 315/209 R, 291, 360, 362, 121
See application file for complete search history.

(56) References Cited

U.S. PATENT DOCUMENTS

| | | | |
|---|---|---|---|
| 8,305,004 B2 | 11/2012 | Shao | |
| 8,334,660 B2 | 12/2012 | Li et al. | |
| 2010/0156319 A1 | 6/2010 | Melanson | |
| 2012/0169240 A1* | 7/2012 | Macfarlane | H02M 1/4225 315/152 |
| 2012/0212134 A1 | 8/2012 | Hariharan | |
| 2012/0217888 A1 | 8/2012 | Chang et al. | |
| 2012/0248986 A1 | 10/2012 | Gibbs | |
| 2012/0268026 A1* | 10/2012 | Crawford | H05B 33/0815 315/210 |

* cited by examiner

*Primary Examiner* — Minh D A
*Assistant Examiner* — Borna Alaeddini
(74) *Attorney, Agent, or Firm* — Downs Rachlin Martin PLLC

(57) ABSTRACT

A current regulator for non-isolated, line voltage LED Driver circuits solves the problem of LED flicker caused by line noise in the visible frequency range. In one aspect of the invention, LED flicker frequency may be increased beyond the line frequency. In another aspect, line voltages in excess of LED voltage ratings may be tolerated. The driver may be implemented using discrete circuit elements or in software and utilizes separate current regulation for different segments of an AC line voltage cycle.

21 Claims, 5 Drawing Sheets

HALF- OR QUARTER-CYCLE CURRENT REGULATOR FOR NON-ISOLATED, LINE VOLTAGE L.E.D. BALLAST CIRCUITS

FIELD OF THE INVENTION

The present invention generally relates to the field of light-emitting diode (L.E.D. or LED) driver circuits. In particular, the present invention is directed to a half- or quarter-cycle current regulator for non-isolated, line voltage L.E.D. driver ("ballast") circuits.

BACKGROUND

LEDs are solid-state devices that produce light when electrical current flows therethrough. They are typically polarized, low-voltage devices, although they may be combined into arrays requiring higher voltages. Despite having minimum and operating voltage specifications, LEDs are typically specified and regulated with respect to the amount of current required for operation. Unlike conventional loads that require a fixed voltage, LEDs typically require a near-constant current for ideal operation.

An LED light source that runs directly from a commercial alternating current (AC) 120 volt (V) power supply ("line voltage") usually requires a current-regulated ballast circuit for ideal operation. This circuit is responsible for both current and temperature regulation, and should be immune to voltage spikes and other noise on the AC line within a predetermined design range.

A non-isolated linear LED driver can provide excellent affordability and reliability and can be made to have a very small profile. Without the additional bulk and cost of a transformer, inductors, and, particularly, electrolytic capacitors, the driver can be made very compact and the detrimental effects of capacitor aging can be minimized.

However, without electrolytic capacitors to filter (or "buffer") the line voltage, the circuit is subject to any noise that might be present on the incoming power lines (or "mains"). Particularly, noise in the visible frequency range, which extends up to about 100 Hz, may be detrimental to the performance of LEDs.

There are several ways that ideal line conditions may be disturbed such that alternating cycles and rising or falling edges may become asymmetrical from their counterparts. These conditions may conspire to create an undesirable visible flicker in the LED light output.

For example, if an LED load draws current from an AC power source that is also connected to a circuit having a poor power factor, the rising and falling edges of the line voltage may become mismatched or asymmetrical. Other sources of line distortion, such as fluorescent lighting ballasts, can easily cause mismatches between edges within the same cycle.

Wall dimmers often use inexpensive DIAC-TRIAC circuits. This type of wall dimmer implements phase-cut style dimming where the rising edge is delayed for some time according to the setting of the adjustment potentiometer. These devices often exhibit asymmetrical behavior in the different operating quadrants of the TRIAC which may result in each alternative half-cycle on the line having slightly differing durations. When a wall dimmer using phase-cut style dimming is connected to the same AC power source as an LED driver, this difference in half-cycles may manifest itself in the LED light output as a disturbing flicker.

One solution for dealing with line voltage variations is to integrate the voltage across a sense resistor provided in series with the LED load and apply the output of the integration (in the form of a voltage) to the gate of a metal-oxide-semiconductor field-effect transistor ("MOSFET") provided in series with the LED load. This works to an extent, but the time constant necessary for good regulation is longer than several cycles of the line voltage; therefore, this type of implementation cannot compensate for short-term fluctuations such as half-cycle or quarter-cycle asymmetry.

In order to compensate for such short-term fluctuations, a massive electrolytic capacitor with a rating about equal to the voltage drop across the LED load may be connected in parallel with the LED array. However, due to their large size and cost, utilizing an electrolytic capacitor in such a way can be detrimental to the compactness and/or price, and thus marketability, of a LED driver.

SUMMARY OF THE DISCLOSURE

Embodiments of the present invention variously address problems of LED flicker caused by line noise in the visible frequency range. In one exemplary embodiment, flicker frequency may be increased beyond the line frequency (at the expense of line distortion). In another exemplary embodiment, line voltages in excess of LED voltage ratings may be used.

In one implementation, the present disclosure is directed to a circuit for use with an alternating current voltage source and one or more light-emitting diodes. The circuit includes a rectifier, a sensor, an electrically variable resistor, and a regulator capable of applying a voltage, which includes at least two integrators, a timer, and at least one switch, wherein the rectifier rectifies the alternating current voltage source to produce a rectified voltage source and provides it to the one or more light-emitting diodes; the sensor detects a circuit condition and provides a sensor output related to the alternating current voltage source; at least one of the integrators provides an integration output based at least on the sensor output; the at least one switch selects the integration output based on a timing signal from the timer; the regulator applies a voltage corresponding to the selected integration output to the electrically variable resistor; and the electrically variable resistor reacts to the applied voltage in order to limit the influence of undesirable variations in the rectified voltage source on the one or more light-emitting diodes.

In another implementation, the present disclosure is directed to a method. The method includes synchronizing a timer with an alternating current voltage source waveform, the timer having at least two increments corresponding to separate portions of a repeating wave cycle in the alternating current voltage source waveform; monitoring a circuit condition; and for each timer increment: generating values in accordance with the monitoring; integrating at least one of the values to produce an integration output; and applying a voltage corresponding to the output to an electrically variable resistor; wherein: the integration output is selected from each of the integration outputs based upon the timer increment; and the electrically variable resistor reacts to the applied voltage in order to mitigate undesirable variations in the voltage source in order to protect a load.

In still another implementation, the present disclosure is directed to a circuit. The circuit includes a rectifier, a load, an electrically variable resistor comprising at least one pin, a sensor, at least two integrators, and at least one switch, wherein the rectifier, the load, the electrically variable resistor, and the sensor are arranged in series; the at least one switch selects at least one of the at least two integrators, electrically connecting a selected integrator with the at least one pin of the electrically variable resistor; and the electrically variable resistor moderates a circuit condition of the load.

In yet another implementation, the present disclosure is directed to a method. The method includes detecting a repeating wave cycle corresponding to an alternating current voltage source waveform, determining a plurality of segments of the repeating wave cycle, and moderating a circuit condition of a load independently for each the segment.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention overcome disadvantages of using a large electrolytic capacitor as discussed above by providing a current regulator configured to adapt to line voltage variations by switching between separate integrators corresponding to the different parts of the incoming line voltage wave. In various embodiments, the integrators may be switched on and off in sequence using edge and/or zero-crossing detection methods, analog switches, and a one- or two-bit counter (or timer), or by any other suitable methods known in the art. In other embodiments, the integrators may be implemented with multi-layer ceramic capacitors (MLCC) or any other capacitors known in the art. However, it should be noted that no electrolytic capacitors are required and that the teachings of the present invention may be implemented in most instances with capacitors having a voltage rating not greater than about 10 V, and in other embodiments employing capacitors with a maximum voltage rating not exceeding about 25 V.

Figure 1:
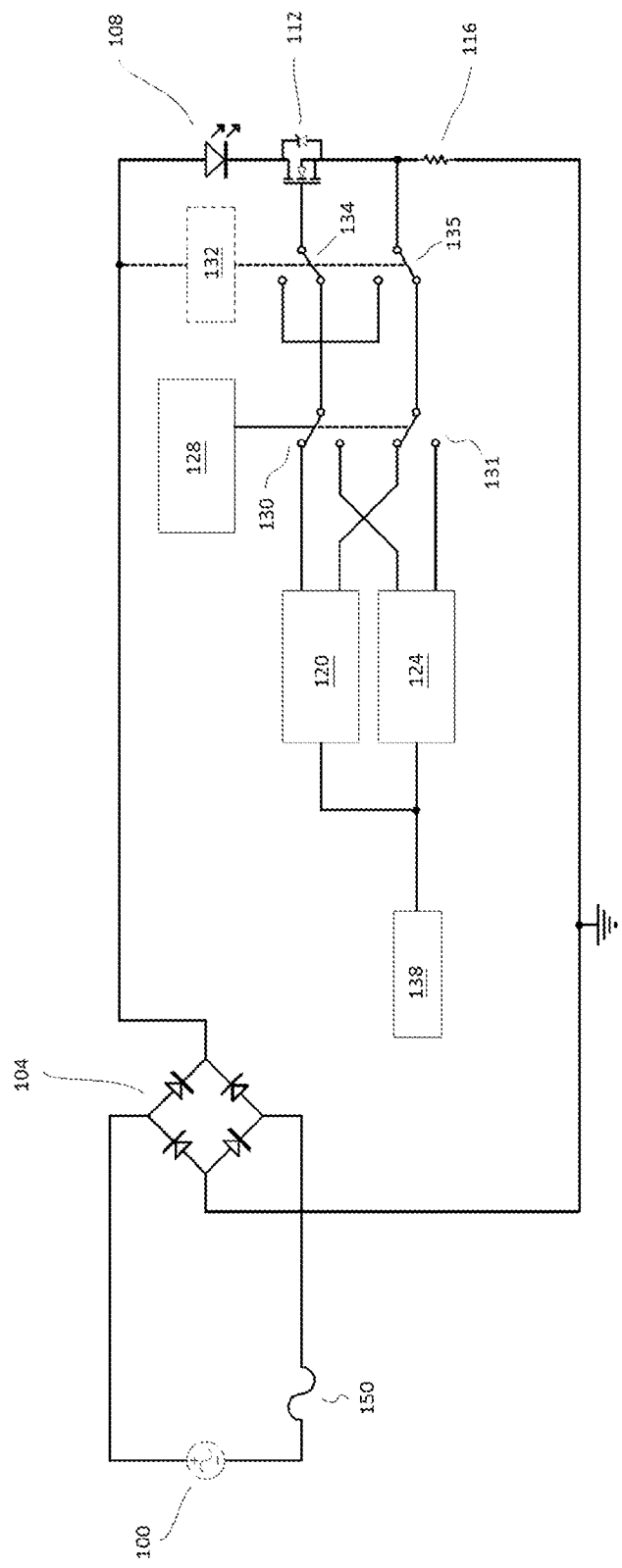
FIG. 1 is a circuit diagram for a LED driver system utilizing two integrators according to an exemplary embodiment of the invention.

As shown in FIG. 1, an AC voltage source 100 may be connected to a bridge rectifier 104, a fuse 150, a LED load 108, a MOSFET 112, and a resistor 116. Integrators 120, 124 may be alternatively switched in and out of the circuit by a detector 128 and switches 130, 131. As the integrators are switched in and out, they produce outputs based on a current reference 138 and the voltage across resistor 116. An optional high-speed cut-out 132, shown in detail in FIG. 3, and switches 134, 135 may be used to protect the LED load 108 from undesirable conditions (discussed further herein below). The integrator output selected by switches 130, 131 is provided to the gate of the MOSFET 112 as long as the high-speed cut-out 132 is not activated (FIG. 1 depicts the case where the cut-out is inactive). In this arrangement, MOSFET 112 acts as a variable resistor in order to moderate the amount of current passing through the LED load 108.

In one exemplary embodiment, two distinct integrators 120, 124 may be provided—one for each half-cycle of the line voltage wave. This approach helps compensate for general line and/or component asymmetry. For this implementation, a circuit as shown in FIG. 1 may be used, and the integrators 120, 124 may be enabled in alternate intervals corresponding to detected half-cycles of the line voltage wave. While an integrator is inactive, it is disconnected from the resistor 116 and it substantially retains the last output it generated while it was active.

In an alternative embodiment, two distinct integrators 120, 124 may be again provided—but in this embodiment, one for the first and third quarters of the line voltage wave and one for the second and fourth quarters of the line voltage wave. This approach helps compensate for asymmetry between rising and falling halves of the rectified circuit voltage. For this implementation, a circuit as shown in FIG. 1 also may be used, and the integrators 120, 124 may be enabled in alternative intervals corresponding to detected half-cycles of the rectified circuit voltage waveform. While an integrator is inactive, it is disconnected from the resistor 116 and it substantially retains the last output it generated while it was active.

Figure 2:
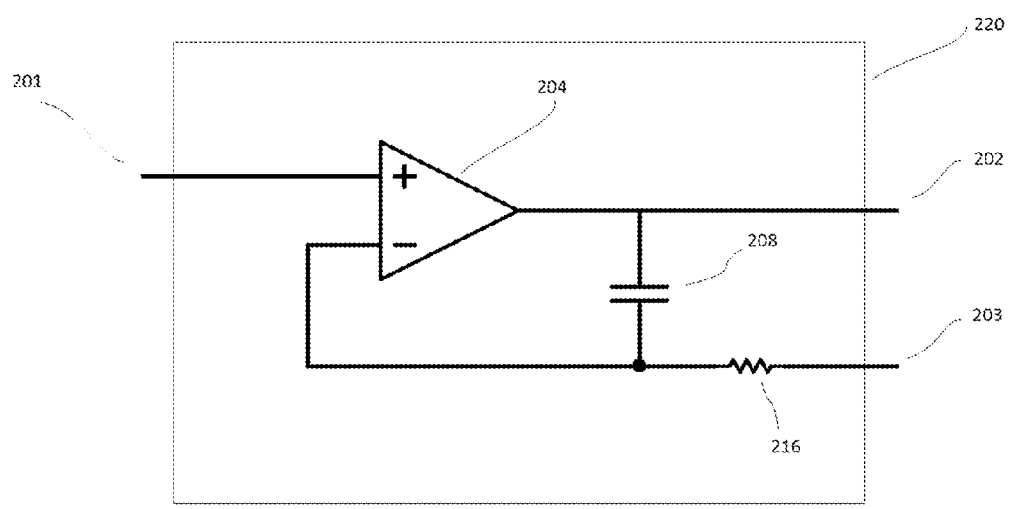
FIG. 2 is a circuit diagram for an exemplary integrator according to an embodiment of the present invention.

FIG. 2 shows an exemplary analog integrator 220 including an operational amplifier (or "op-amp") 204, a capacitor 208, and a resistor 216, as is known in the art, that may be used to implement the integrators 120, 124 in the circuit of FIG. 1. A current reference 138 and, in alternative time periods (as determined by detector 128), the voltage across the resistor 116, may be provided as inputs to the integrator 220 on the "left" pin 201 and the "lower-right" pin 203 respectively; the output is selectively provided to the gate of the MOSFET 112 via the "upper-right" pin 202, as described above. The current reference 138 is determined at design time (i.e., predetermined by the time of circuit fabrication) based on ideal/desired conditions of the LED load.

Figure 3:
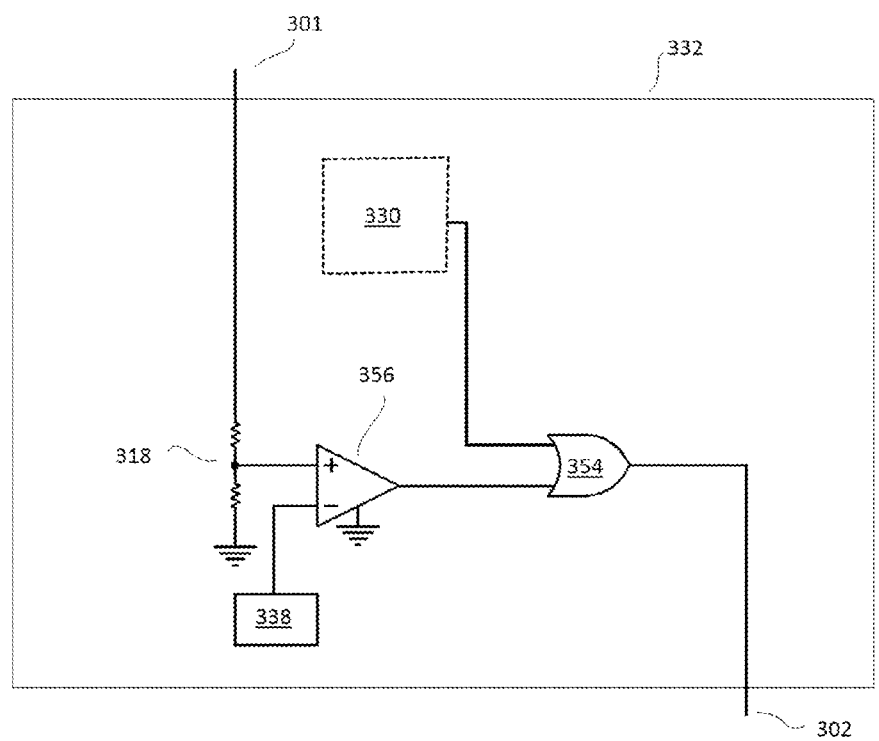
FIG. 3 is a circuit diagram for an exemplary high-speed cut-out according to an embodiment of the present invention.

FIG. 3 shows an exemplary analog high-speed cut-out 332 including a comparator 356 and a voltage divider 318, connected to "upper" pin 301, that may be used to implement the high-speed cut-out 132 shown in the circuit of FIG. 1. An over-volt reference 338 and the output of the voltage divider 318 may be provided as inputs to the comparator 356. The output of the comparator 356 and the output of an optional temperature sensor 330 may be input to an "OR" logic gate 354. The OR gate 354 outputs its result on pin 302. The "upper" pin 301 may be connected to the circuit of FIG. 1 between the comparator 104 and the LED load 108, while the "lower" pin 302 may be operatively connected to the switches 134, 135 in FIG. 1. This arrangement results in the high-speed cut-out 332 selectively toggling switches 134, 135 in order to protect the LED load 108 from undesirable conditions (discussed further herein below). The over-volt reference 338 may be determined at design time (i.e., predetermined by the time of circuit fabrication) based on ideal/desired conditions of the LED load.

Figure 4:
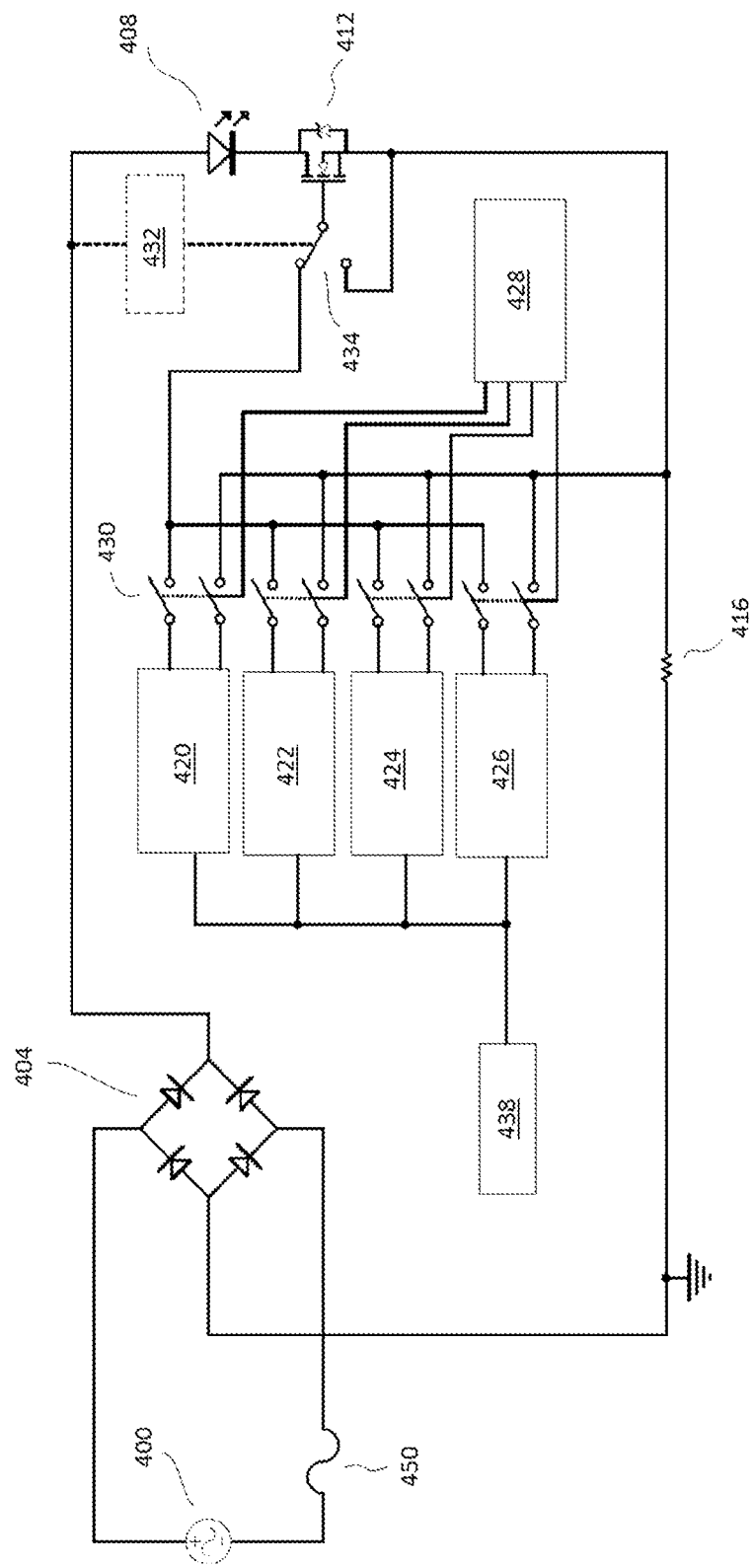
FIG. 4 is a circuit diagram for a LED driver system utilizing four integrators according to an alternative embodiment of the present invention.

In another alternative embodiment, as shown in FIG. 4, four distinct integrators 420, 422, 424, 426 may be provided—one for each of the four quarters of the line voltage wave cycle. This approach helps compensate for asymmetry between any of the four quarters of the line voltage wave. For this implementation, a circuit as shown in FIG. 4 may be used, and the integrators 420, 422, 424, 426 may be sequentially enabled in alternating intervals corresponding to quarter-cycles of the line voltage wave.

As shown in FIG. 4, an AC voltage source 400 may be connected to a bridge rectifier 404, a fuse 450, a LED load 408, a MOSFET 412, and a resistor 416. Integrators 420, 422, 424, 426 may be sequentially, alternately switched in and out of the circuit by a counter or timer 428 and switches 430. FIG. 2 shows an analog integrator 220, described above, which may be used to implement the integrators in the circuit of FIG. 4. As the integrators are switched in and out, they produce outputs based on a current reference 438 and the voltage across resistor 416. While an integrator is inactive, it is disconnected from the resistor 416 and it substantially retains the last output it generated while it was active. An optional high-speed cut-out 432, shown in detail in FIG. 3, and switch 434 may be used to protect the LED load 408 from undesirable conditions (discussed further herein below). The integrator output selected by switches 430 is provided to the gate of the MOSFET 412 as long as the high-speed cut-out 432 is not activated (FIG. 4 depicts the case where the cut-out is inactive). In this arrangement, MOSFET 412 acts as a variable resistor in order to moderate the amount of current passing through the LED load 408.

Figure 5:
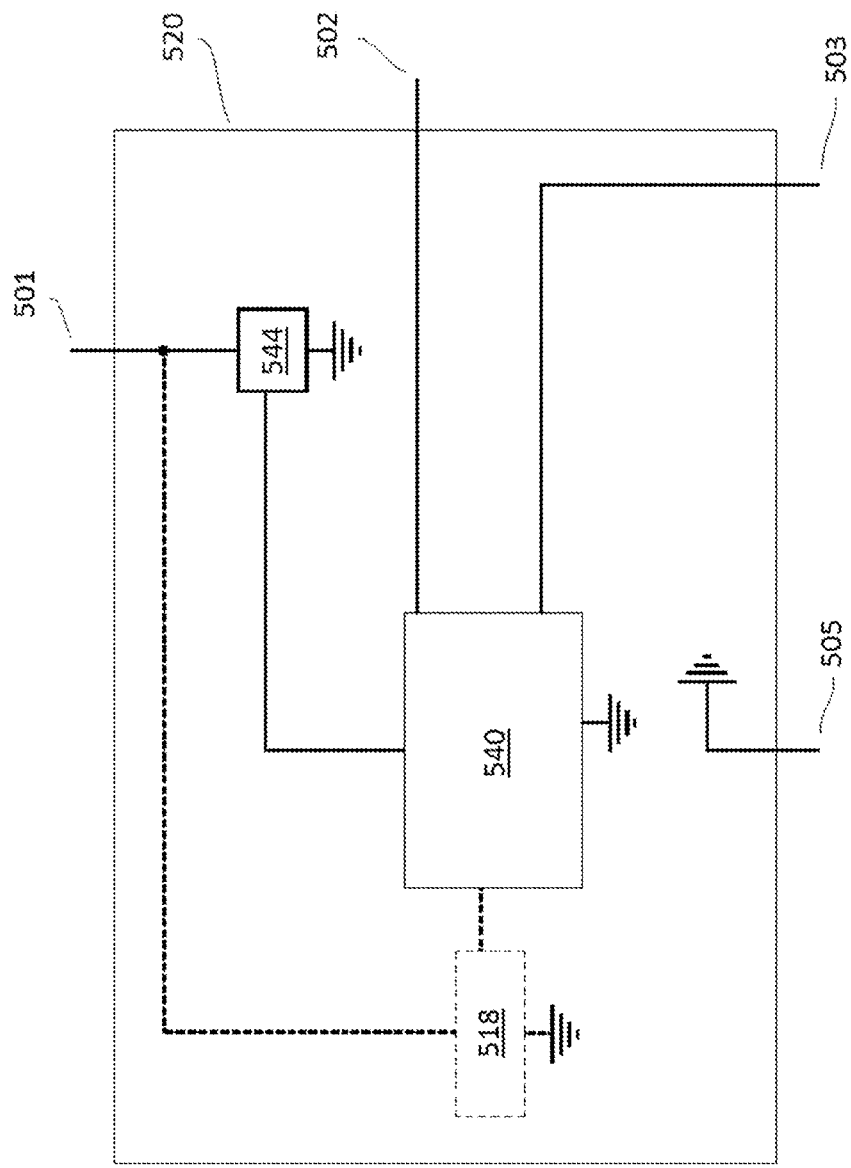
FIG. 5 is a circuit diagram for a LED driver system utilizing a microprocessor according to a further alternative embodiment of the present invention.

According to one aspect of the invention, a microprocessor arrangement 520 as shown in FIG. 5 may be used to implement select parts of the circuit including at least the integrators 120, 124, 420, 422, 424, 426, the switches 130, 131, 134, 135, 430, 434, the detector 128, the counter 428, the comparator 304, the references 138, 338, 438, and the OR gate 354. A suitable microprocessor arrangement 520 may comprise an "upper" pin 501, a "right" pin 502, a "lower-right" pin 503, a "lower-left" pin 505, an about 1.8 V to 5 V voltage regulator 544, a microprocessor 540, and an optional over-voltage detector 518. The microprocessor 540 may be an analog-enabled digital processor or any other suitable processor known in the art. This approach eliminates the need for select discrete analog circuit elements and, as a result, may allow for more cost savings and result in a more compact implementation.

In an exemplary embodiment comprising a microprocessor, a circuit like that shown in FIG. 4 may be used (with the microprocessor-implemented parts being replaced by the microprocessor arrangement 520). The voltage regulator 544 of an exemplary microprocessor arrangement 520 may be connected between the "upper" pin 501 of the microprocessor arrangement 520 and the microprocessor 540 and may provide a regulated voltage of about 1.8 V to 5 V to the microprocessor 540, as is known in the art. The "upper pin" 501 may be connected to the circuit of FIG. 4 between the rectifier 404 and the LED load 408, while the "lower-left" pin 505 may be connected to the circuit of FIG. 4 between the resistor 416 and the rectifier 404 in order to provide a common ground for the microprocessor arrangement 520. The "lower-right" pin 503 of the microprocessor arrangement 520 may be connected to the circuit of FIG. 4 between the resistor 416 and the MOSFET 412 in order to provide the microprocessor 540 with the voltage across the resistor 416. Outputs of the microprocessor 540 may be generated via software in accordance with the functionality described above and selectively provided to the gate of the MOSFET 412 via the "right" pin 502 of the microprocessor arrangement 520 in accordance with the desired regulator functionality (half cycle, quarter cycle, etc.), as described above. The software may be stored in random-access memory (RAM), read-only memory (ROM), or any other suitable machine readable hardware storage known in the art and accessible to the microprocessor 540.

An optional over-voltage detector 518 may be connected between "upper" pin 501 and microprocessor 540 of microprocessor arrangement 520. In the event that the over-voltage detector provides an indication of undesirable circuit conditions, such as a voltage spike, in its output to microprocessor 540, microprocessor 540 may apply a gate voltage to MOSFET 412 having a substantially equivalent voltage to the voltage across resistor 416, effectively resulting in electrical isolation of LED load 408. For the over-voltage detector 518, a circuit as shown in FIG. 3 may be used; alternatively, the over-voltage detector may be implemented in software.

According to an aspect of the invention, briefly referenced above, a high-speed cutout may be used to account for abnormal line voltage, current, or temperature. This can help to protect the LED load from damage. The high-speed cutout may be implemented with analog switches that disconnect the integrators from the gate of the MOSFET and substantially simultaneously short (or connect) the MOSFET's gate to its source (see FIG. 3 and FIG. 4 for exemplary embodiments). The high-speed cutout may also be implemented with an over-voltage detector and software (as described above in reference to FIG. 5) or by using any other methods known in the art.

By enabling separate current regulation for distinct segments of the AC line voltage cycle, embodiments of the present invention diminish or eliminate flickering resulting from undesirable line disturbances. In order to account for the use of a Triode for Alternating Current ("TRIAC") dimmer, a circuit like the one shown in FIG. 1 may be used to attempt to ensure a match between each half of the line voltage cycle. In the case of extreme asymmetry in the line voltage, a circuit like the one shown in FIG. 4 may be used in an attempt to ensure that each quarter cycle of the line voltage provides nearly identical current to the LEDs.

In addition to precluding the visible effects of line voltage noise, embodiments of the present invention provide other advantageous arrangements. Using a circuit like the one shown in FIG. 4, it is possible, by setting a suitable overvolt reference 338, to use the high-speed cutout 432 to generate a LED drive frequency that is about double the line voltage frequency by engaging the high-speed cutout between the first and second cycles and third and fourth cycle of the line voltage. Of course, this is done at the expense of power factor and line distortion. However, this corresponds to the time of greatest heat dissipation and power loss in the MOSFET. Accordingly, this technique may be used to improve efficiency. Any timing errors or asymmetry in the line voltage would ordinarily negatively impact the effectiveness of this method, but these effects may be compensated for by using separate current regulation for each quarter cycle of the AC line voltage cycle, as described above.

Another potential advantage enabled by embodiments of the present invention is related to the fact that if there is a significant mismatch between the LED load voltage and the line voltage, a large power dissipation would usually occur in the MOSFET in the form of heat. By utilizing a high-speed cut-out with a suitable over-voltage reference, the LED load may be electrically isolated during these periods of high voltage and dissipation. This allows for efficient drive of a low voltage, low power LED array directly from the line. Using separate current regulation for each quarter cycle of the AC line voltage cycle again compensates for any low frequency line anomalies that could otherwise potentially induce flickering.

This arrangement may be further extended to create a multi-voltage device that could operate, for example, using either AC 120 V or AC 240 V nominal line voltages. The LED array may be driven at line voltage frequency for AC 120 V operation and switched to being driven at double the line frequency when connected to AC 240 V by utilizing a high-speed cutout with a suitable over-voltage reference. The high-speed cutout may be employed between the first and second quarters and between the third and fourth quarters of the AC 240 V repeating wave cycle, where the elevated power dissipation (due to increased voltage) would be unwanted or wasteful, and the quarter-cycle regulation, as described above, reduces or eliminates any visible artifacts that may have been caused by frequency conversion and/or line noise.

Though exemplary embodiments have been described with reference to MOSFETs, any device with suitable electrically variable resistance characteristics may be used including, but not limited to, bipolar junction transistors (BJT), vacuum tubes, a plurality of transistors, any suitable combination thereof, or any other electrically variable resistor. Likewise, though exemplary embodiments have been described with reference to a voltage divider, any suitable means of providing suitable voltages may be used. Further, though exemplary embodiments have been described with reference to integrators, any suitable discrete circuit elements or mathematical operations (in the case of using a microprocessor) may be used.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A circuit for use with an alternating current voltage source and one or more light-emitting diodes, comprising:
    a rectifier;
    a sensor;
    an electrically variable resistor; and
    a regulator capable of applying a voltage, comprising:
        at least two integrators;
        a timer; and
        at least one switch;
    wherein:
        said rectifier rectifies said alternating current voltage source to produce a rectified voltage source and provides the rectified voltage source to said one or more light-emitting diodes;
        said sensor detects a circuit condition and provides a sensor output related to said alternating current voltage source;
        at least one of said integrators provides an integration output based at least on said sensor output;
        each said integrator only provides an integration output based on said sensor output while said integrator is selected by said switch;
        said at least one switch selects said integration output based on a timing signal from said timer;
        said regulator applies a voltage corresponding to said selected integration output to said electrically variable resistor; and
        said electrically variable resistor reacts to said applied voltage in order to limit the influence of undesirable variations in said rectified voltage source on said one or more light-emitting diodes.

2. The circuit according to claim 1, wherein said sensor comprises a resistor.

3. The circuit according to claim 1, wherein said circuit condition is a voltage or a current.

4. The circuit according to claim 1, wherein one or more elements are implemented in a microprocessor.

5. The circuit according to claim 1, wherein said alternating current voltage source comprises a repeating wave cycle and said timer generates at least two increments corresponding to and synchronized with separate portions of said wave cycle.

6. The circuit according to claim 5, wherein said switch selects said integration output sequentially and repeatedly from said integrators and each integrator is associated with a distinct one of said timer increments.

7. The circuit according to claim 1, wherein said regulator comprises at least four integrators.

8. The circuit according to claim 1, including a cut-out circuit.

9. The circuit according to claim 8, wherein said cut-out circuit detects at least one of a temperature, current, and voltage, and, in the event of an undesirable temperature, current, or voltage, acts to electrically isolate said one or more light-emitting diodes from said rectified voltage source.

10. The circuit according to claim 8, wherein said alternating current voltage source comprises a repeating wave cycle and said cut-out circuit activates at least twice per said wave cycle.

11. The circuit according to claim 8, wherein said cut-out circuit, upon activation, prevents all of said integrators from receiving said sensor output at substantially the same time as it causes said electrically variable resistor to electrically isolate said one or more light-emitting diodes from said rectified voltage source.

12. The circuit according to claim 1, wherein said electrically variable resistor comprises a MOSFET.

13. The circuit according to claim 1, wherein each said integrator substantially retains a last output generated while selected by said switch throughout periods in which said integrator is not selected by said switch.

14. A circuit, comprising:
    a rectifier;
    a load;
    an electrically variable resistor comprising at least one pin;
    a sensor;
    at least two integrators; and
    at least one switch,
    wherein:
        said rectifier, said load, said electrically variable resistor, and said sensor are arranged in series;
        said at least one switch selects at least one of said at least two integrators, electrically connecting a selected integrator with said at least one pin of said electrically variable resistor; and
        said electrically variable resistor moderates a circuit condition of said load.

15. The circuit according to claim 14, including a cut-out circuit operable to electrically isolate the load.

16. The circuit according to claim 14, wherein said load comprises at least one light-emitting diode.

17. The circuit according to claim 14, wherein said electrically variable resistor comprises a MOSFET.

18. The circuit according to claim 14, wherein said sensor is a resistor.

19. The circuit according to claim 14, said circuit comprising at least four integrators.

20. The circuit according to claim 14, wherein each said integrator is disconnected from said electrically variable resistor while it is not selected by said switch.

21. The circuit according to claim 14, wherein each said integrator substantially retains a last output generated while selected by said switch throughout periods in which it is not selected by said switch.

* * * * *